US005980676A

United States Patent [19]

Meetze

[11] Patent Number: 5,980,676

[45] Date of Patent: Nov. 9, 1999

[54] METHOD OF MULTIPLE COPY SETS DISTRIBUTION WITH TEMPORARILY TAPED SET DISTINCTIONS

[75] Inventor: Murray O. Meetze, Rochester, N.Y.

[73] Assignee: Xerox Corporation, Stamford, Conn.

[21] Appl. No.: 08/128,929

[22] Filed: Sep. 29, 1993

Related U.S. Application Data

[62] Division of application No. 07/808,241, Dec. 16, 1991, abandoned.

[51] Int. Cl.[6] .................... B32B 31/10

[52] U.S. Cl. .................... 156/216; 156/247; 156/277; 270/58.08

[58] Field of Search .................... 100/8, 11, 13; 156/289, 216, 227, 464, 277, 247; 24/67 AR, 67 R; 270/58.08

[56] References Cited

U.S. PATENT DOCUMENTS

| | | | |
|---|---|---|---|
| 382,813 | 5/1888 | Jones | 24/67 AR |
| 1,875,610 | 9/1932 | Jeffery et al. | 156/464 |
| 1,946,056 | 2/1934 | Birdsey | 156/464 |
| 2,080,734 | 5/1937 | Mull | 24/67 AR |
| 3,152,943 | 10/1964 | Eddison et al. | 156/483 |
| 3,535,189 | 10/1970 | Hall et al. | 156/486 |
| 3,691,140 | 9/1972 | Silver | 260/78.5 |
| 4,126,983 | 11/1978 | Ito et al. | 100/27 X |
| 4,151,037 | 4/1979 | Klingelhoefer et al. | 156/477 |
| 4,160,687 | 7/1979 | Spear | 156/216 X |
| 4,166,152 | 8/1979 | Baker et al. | 428/522 |
| 4,473,425 | 9/1984 | Baughman et al. | 156/356 |
| 4,486,032 | 12/1984 | Leahy | 24/67 AR X |
| 4,596,620 | 6/1986 | Karolyi | 156/479 |
| 4,644,026 | 2/1987 | Shuman et al. | 524/270 |
| 4,657,960 | 4/1987 | Shuman et al. | 524/270 |
| 4,684,685 | 8/1987 | Shuman et al. | 524/270 |
| 4,755,550 | 7/1988 | Shuman et al. | 524/270 |
| 4,770,320 | 9/1988 | Miles et al. | 221/33 |
| 4,776,575 | 10/1988 | Mayer et al. | 271/33 |
| 4,797,048 | 1/1989 | Doery | 412/11 |
| 4,828,645 | 5/1989 | Van Bortel | 156/216 X |
| 4,895,746 | 1/1990 | Mertens | 428/40 |
| 4,946,154 | 8/1990 | Nakamura | 270/53 |
| 4,970,554 | 11/1990 | Rourke | 355/202 |
| 4,987,447 | 1/1991 | Ojha | 355/204 |
| 5,084,127 | 1/1992 | Nakamura | 156/483 |
| 5,159,798 | 11/1992 | Hannon | 156/216 X |
| 5,172,179 | 12/1992 | Tani et al. | 355/324 |

FOREIGN PATENT DOCUMENTS

| | | | |
|---|---|---|---|
| 1075558 | 4/1980 | Canada | 156/216 |
| 0266454 | 5/1988 | European Pat. Off. . | |
| 0300742 | 7/1988 | European Pat. Off. . | |
| 8701920 | 6/1988 | Germany . | |
| 1164054 | 9/1969 | United Kingdom . | |

*Primary Examiner*—Curtis Mayes

[57] ABSTRACT

A simple and low cost system for temporarily but securely holding together stacked document sheets in discrete "packaged" sets, for reproduction job collection and distribution without permanent binding or sheet damage. It is particularly suited for automatic application to collated copy sheet output of a copier, shared printer or facsimile machine. Each job or selected output stack of printed sheets may be temporarily bound by small adhesive tape segments, much smaller than the sheets, so as to maintain the sheet set integrity under distribution and other handling, yet allow removal of the tape whenever desired to unbind the stacked sheets without any damage to the sheets, unlike stapling or other such permanent binding. It has been found that by wrapping one small tape segment around each of two opposing edges of a job stack of multiple sheets, with adhesion of at least part of each tape segment only to small opposing edge areas of the top and bottom sheets of the stack, that a whole job stack can be integrally held together for convenient set separation, handling and distribution, yet separated at any time, unmarked and undamaged, by easily peeling or tearing off the tape segments. Encoding tape segments with set identifying indicia, and/or tape removal assistance, and cover sheets, may be compatibly provided.

17 Claims, 8 Drawing Sheets

METHOD OF MULTIPLE COPY SETS DISTRIBUTION WITH TEMPORARILY TAPED SET DISTINCTIONS

This is a divisional of a copending application No. 07/808,241, filed Dec. 16, 1991, entitled REMOVABLE SET RETAINING SYSTEM FOR COPY SHEETS, now abandoned, and is also related to copending application No. 07/808,133, filed Dec. 16, 1991, entitled REMOVABLE JOB SET RETAINING AND IDENTIFYING SYSTEM FOR COPY SHEETS, now abandoned, all by the same inventor, and the disclosures of which are incorporated herein by reference.

Cross-reference is made to a copending application by the same assignee and the same inventor, filed contemporaneously as U.S. application No. 07,808,133 entitled "REMOVABLE JOB SET RETAINING AND IDENTIFYING SYSTEM FOR COPY SHEETS"; and to a copending application by the same assignee by Michael A. Malachowski, et al, filed Aug. 9, 1990, as U.S. application No. 07/564,559, entitled "Method and Apparatus for Making Envelopes On-Line for Direct Mail Application" now U.S. Pat. No. 5,118,375, issued Jun. 2, 1992.

Disclosed is an improved system for temporarily but effectively retaining or fastening together a selected set of plural outputted copy sheets from a copier or printer in a single integral stacked set, readily separable from other copy sheets and copy sheet sets. This may be done simply, rapidly, and at low cost, without any damage to the sheets or their images. Yet, in the disclosed system, the sheets may be easily manually released from said integral set retention without requiring tools and without any damage to the sheets or their images, unlike stapling or conventional glue binding systems heretofore utilized.

The disclosed system may be utilized to temporarily hold together, for collection and/or distribution in separate sets, without permanent binding, a wide range of stacked sheet set materials, weights and thicknesses.

The disclosed system may be effectively utilized as part of an overall system for job set compiling, set separation, set distribution, and individual sheet distribution in which job sets of plural individual copy sheets are compiled and "packaged" by being temporarily edge bound into discrete sets, having set integrity with resistance to sheet skewing, sheet fanning, and other sheet misalignment relative to the other individual sheets in said bound set during set handling and distribution, so as to be readily separated, handled and distributed as bound sets, even if commonly stacked with other such bound sets, yet subsequently readily manually unbound for distribution or use of said individual sheets thereof by removal of said small segments of adhesive binder tape without damage to said individual sheets thereof.

There is further disclosed herein such a system of securely binding an output stack of printed sheets together by means of low-tack adhesive tape segments, so as to maintain the sheet set integrity under distribution handling, yet to allow the user to remove the tape whenever desired to unbind and unstack the stacked sheets without any damage to the sheets.

There is further disclosed herein a system of applying a low-tack adhesive tape at opposite sides of sequential outputted sets or stacks of sheets such that each set or stack is temporarily held together for stacking and handling by temporarily taping small areas on the top and bottom surfaces of the stack of sheets.

It has been found that by wrapping only one tape segment around each of two opposing edges of a stack of sheets, with adhesion of each tape segment only to small opposing edge areas of the top and bottom sheets of the stack, that the whole stack can be held together, yet easily separated at any time by the tape segments being peeled off, without any damage, unlike stapling or other such permanent binding.

This may be accomplished with either manual or automatic application of removable temporary binding elements, preferably comprising two small short strips of paper tape, bearing a low-tack adhesive, partially taped around (partially wrapped around) two opposing edges of each outputted set stack so as to removably engage respective minor edge portions of the top and bottom surfaces of the set stack (the top and bottom sheets), which strips or segments of tape are much smaller than the sheets being taped, and are readily removable from said top and bottom sheets without any damage to the sheets or their images.

The disclosed temporary set binding elements cause less sheet damage, and have less projection and set thickness effect, for reduced interference with stacking or relative movement of plural stacked sets, as compared to staples or paper clips normally used for temporary binding of copy sets.

If automatic application of the removable temporary binding elements is provided, it can be done with relatively simple and compact apparatus. That apparatus can, if desired, be compatible with, or even located in the same area as, and utilize, existing copy sheet set compilers for existing finishers.

The disclosed system can also provide a degree of document set privacy or security in that the document sheets in the set sheets cannot be fully opened, and only the cover sheets can be easily read, without removing a binding element.

As disclosed in the embodiment example herein, as an additional feature, the low-tack adhesive areas of the binding tape preferably do not run all the way out to (at least one) edge so that the tape may be readily lifted off of the sheets to which it is temporarily adhered. These non-adhesive areas or segments of the tape may also be marked or indicated, such as with printed removal instructions, such as "lift here," or the like. That is, preferably easily liftable adhesive void or killed areas or strips (non-adhesive edge areas) are provided, and so marked, and/or colored.

The concept disclosed in the embodiment hereinbelow is to partially tape around both of two opposite sides of each outputted set or stack with a short strip of low-tack tape much smaller than the sheets being taped. [Not just on only one side, as is required in conventional binding for the set be openable or readable.] This may be done here by taping small areas of only the top and bottom surfaces of the stack (only the top and bottom sheets). This system does not require taping or binding the edges or spline of the set of sheets, and does not apply adhesive in between sheets, as in normal binding, or as in computer printed multilayer forms. Also, this tape may be have a low adhesive strength, allowing it to be removed from the copy paper without damaging the paper or its images. By simply so applying tape segments at opposite sides of each stack or set, the sheets thereof may be sufficiently temporarily held together for normal stacking and handling as an integral set, by itself, or with other such sets, without requiring said normally required edge or spline binding, or any other fastening.

By way of background, unbound sets of copy sheets are difficult to keep tidy, sort or separate from each other. It is known for copiers and printers to provide offsetting of sequential unbound copy sets which are otherwise being commonly stacked, so as to facilitate separation and sorting, but such copy set offsetting is easily disturbed. Also, set offsetting interferes with the transporting and distributing of the common stack of plural offset sets. Integrity of individual unbound set stacks is easily disturbed during handling. Suitable trays or containers designed for standard sized sheets will not accommodate the additional dimensions required to allow for the offset sheets. Furthermore, the projecting edges of the offset set sheets are not as well protected and are more easily damaged.

Further by way of background, staples are probably the most common method of fastening sets of sheets together at or after the output of a copier or printer, even when the fastening is intended to be temporary. However, the use of staples has numerous disadvantages. They require a special mechanical apparatus to drive staples through the sheets. That process makes holes in all the stapled sheets. The holes in the sheets are unsightly and can even create shadows which will print out on second generation copy sheets as black spots. The legs of the staple must be pre-cut, or cut and formed from a wire spool by a stitcher, with legs of appropriate length for the set thickness, i.e., the particular number and weight of the particular set sheets selected to be stapled together. Otherwise, effective stapling may not be accomplished for smaller or larger sets. Furthermore, stack sets of, e.g., more than 30 pages, may require heavier metal (heavy duty) staples which adds to the staple insertion and removal difficulties. A staple has a very small cross sectional area, which puts a high stress concentration on the surrounding paper, tending to tear the paper or weaken it at the staple. The removal of the staples can be difficult, and requires a tool to be safe or effective—a mechanical staple remover. It is not unusual for people to puncture fingers with staples in the process of applying or removing them, or if the legs of the staples are not properly folded over, and stick out from the sheets. That also interferes with stapled set stacking or other relative movement between stapled sets. Removal of the staples may enlarge the holes in the sheets or even tear the sheets. The removed metal staples themselves can cause serious damage to copiers and printers by falling into their machinery. Staples also have the ecological disadvantage of interfering with the recycling of the paper if they are not all removed and separated out from the waste paper.

If copy sheets are stapled together, and the staples are not all removed, and additional copies are made from those copy sheets, the presence of the staples can scratch the platen glass of the copier and/or damage the document handling apparatus and/or cause tearing of the document sheets as an automatic document handler attempts to separate the sheets for feeding. Document sheets stapled together can also result in “double feeding” or “slug” feeding of multiple sheets which can miss the copying of whole page images, confuse the count of the documents, jam the document feeder, and/or cause such originals to be damaged. This inadvertent feeding of stapled copies in a document feeder occurs fairly often because the staples are not visible from the edges of the stapled side of the documents. That is, if there are staples buried within a set of unstapled documents, it is very difficult to see any external sign that some of the sheets are stapled together.

This lack of side indications of stapling in a stack of plural stapled sets also interferes with proper operator picking up of stapled sets. It can cause tearing off of sheets when an operator inadvertently grabs only a portion of a stapled set.

Another common method of temporarily holding or binding sheets together is the use of paper clips. These have many of the above-listed disadvantages of staples. In addition, paper clips are notoriously insecure. They can easily fall off, or be pushed off, especially when one clipped set is moved or slid relative to another clipped set. Alternatively, one clip can easily catch and acquire other additional sheets accidentally in the movement of clipped sets. This also interferes with the stacking of plural clipped sets, as does the thickness of the clips themselves. Nor is there any known commercial system for automatically applying paper clips to the output of a copier or printer, although so doing is disclosed in Fuji Xerox U.S. Pat. No. 4,946,154, infra.

Other well known methods of binding sets of copy sheets together include glue bonding and/or plastic or metal binding strips. These have numerous other disadvantages such as impossibility of removal without sheet damage, or difficulty of application and/or removal, and/or size and expense and materials waste. Likewise as to folders, bags, envelopes, shrink wrapping and other such packaging.

A file folder, bag or envelope to hold even a thin stack or set of conventional letter size paper sheets will consume more than about 1200 square centimeters of material. [The system disclosed herein can provide temporary set segregation with less than approximately 2 percent of that amount of material.]

Another previously known system of temporarily holding together certain types of sheets utilizes paper straps or bands, which are wrapped completely around the set of sheets and taped together by adhesive where the ends of the paper band overlap. This type of paper banding is typically used to hold together envelopes, stationery, paper currency, etc. These paper binding tapes are then torn to remove the banded set. It will be appreciated that, compared to the present system, much longer tapes and more complex equipment or handling is required for such banding, and the bands are not fastened to any of the sheets of the set other than by friction.

Of particular interest, it is also known to use a small circular or other such tape or tape segments to seal together for mailing or distribution the unfolded (otherwise open) edges on one side of a folded sheet, such an advertising flyer, or a folded and center (saddle) stitched or stapled (signature set) booklet, by wrapping the tape segment around that one edge. However, that is not believed heretofore to have been available for application as integral or direct on-line binding of collated output of a conventional xerographic copier or printer as that output is being produced by the copier or printer as normal unfolded sheets. In any case, this is only single edge taping of sheers which are already integral or permanently fastened together.

Yet, in spite of the very long-standing, well known, difficulties with the above noted, and other, sheet binding systems, their commercial usage has persisted on a very wide scale for very many years because of the lack of suitable alternatives for holding sheets together in a simple, low cost, manner; especially, in a removable manner. There are many applications in which it is not desirable to permanently bond or bind copy sheets together. It is often desirable to separately distribute sheets of a set, or further process selected sheets, or make further copies of selected sheets, all of which is impaired by permanent binding systems. Thus, there is a long standing need for better temporary, removable, binding systems.

A particular problem which the present system addresses is that modern printers, copiers, fax machines and workstation terminals are now more and more utilized as shared and/or integrated components of overall office systems, in which they are cost-effectively shared by plural users, electronically and/or physically. Loose sheets of paper in an output tray, sorter bins, or mailboxes of the printer/copier/fax generated by different system users, or different jobs, are not easily sorted into separate sets for convenient delivery to those system users or their intended recipients. Merely offsetting copy sets (with alternating different side registration positions), or inserting color slip sheets or the like between sets, has not been found to be particularly effective in maintaining said set separation, and does not maintain set integrity. Removal of one or all of merely offset stacked sets frequently jumbles or intermingles pages and sets together and requires tedious manual sheet separations. Throw-away cover or insert slip sheets between each job set are material wasteful, and some colored paper stocks even cause paper recycling difficulties.

Further by way of background, as xerographic and other copiers and printers increase in speed, and become more automatic, it is increasingly important to provide higher speed, more reliable and more automatic handling of the copy sheets being copied or printed, i.e., the output of the copier or printer. It is particularly desirable to segregate separate sets of output copies made by or for different users or customers, even if the copier or printer is a stand-alone rather than a networked unit. Plural sheets in a desired associated stack are referred to as a "set" herein. Normally, desirably, the copy sheets (copies) are outputted and maintained in collated or related page order [even though no physical page number may be present]. This is normally, but not necessarily, the same, or the reverse of, the order in which the original documents or electronic page images were copied. In modern copiers or printers, covers or slip sheets or other inserts may be automatically added to sets, subsets or chapters by the copier or printer itself feeding the cover stock or other slip sheet from separate supply stacks at the correct times to be automatically interleaved with the normal sequential output of copy sheets, with or without printing. That can be desirable for various reasons, but does not provide physical set integrity.

In contrast, the present system "packages" sets of sheets in such a way that the individual job sets are clearly distinguishable from one another even if commonly stacked. The present sets are readily stacked, readily separately identified and removed, and yet set integrity is maintained during removal and other handling. Yet the binding elements are readily removable without leaving any traces thereof or any damage to the sheets or their images. The collected sheets held together in a set by the present system maintain their integrity and unity until the temporary binding is removed, which may be done here simply by peeling off the holding tapes as described herein.

Unlike sets of sheets stapled on only one corner or edge, in the present system the sheets cannot spread open or skew within their bound set, and therefore are also much less subject to wrinkling or damage by handling or relative movement between adjacent sets. Thus, the sets bound in accordance with the present system have robust integrity; for manual removal from the copier or printer; for sorting; for delivering; for filing, etc., even though the sets are comprised of separate individual sheets.

Thus, the present binding system may even be combined with conventional stapling of the same sets, if desired, in some cases. The present system may also be used to temporarily package together plural stapled sets for common handling, if desired.

Furthermore, the present system is particularly appropriate to provide useful set identification edge marking indicia, on a binding element, if desired. This can aid in set identification, separation, distribution and/or filing operations. It can also allow these time consuming office functions to be at least partially automated, if desired, by known wands or other bar code or indicia readers, and/or automatic mailing and distribution and/or filing systems controlled by such set indicia readers. If desired, such a bar coding or other user unique (and/or job unique) set identifier can be automatically printed onto the subject binding strips before or during binding. This may be done by an ink jet, thermal, or other tape printers (e.g., as in fax or supermarket printers) in, and/or in electronic communication with, the printer or copier for the job sheet set itself.

That is, the present system can optionally additionally provide the further function of providing useful set identity or identification by the use of specially printed words, numbers, bar codes, colors, aperture patterns, or other marking indicia. If this indicia is on or extends to the portion of the tape wrapped around an edge of the set, otherwise commonly batched plural sets may readily delineated from one another by indicia which is readily visible at the edges of the stacks, i.e., without lifting up or sorting through the sets. This allows common stacking of plural job sets without requiring offsetting. Thus, desirably, multiple job sets and/or shared jobs from different systems users can be collected in simple common output trays, or fed into boxes or containers corresponding to the dimensions of the copy sheets, with all of the sets neatly stacked therein to the same edge alignment, yet without confusion between the sets, and with each separate set being readily removable without disturbing the sheets of adjacent or other sets, and with visual set identification and/or alphanumeric machine readability or set ordering. Alternatively, the binding position of the tape relative to the edge may be varied, to shift the edge visible indicia or otherwise provide varied edge visible indicia.

By way of background art as to bar code job identifier printing or sheet insertion controls in a copier or printer, there is noted Xerox Corporation York et al U.S. Pat. No. 4,602,776, and particularly Rourke U.S. Pat. No. 4,970,554, and also Rourke et al U.S. Pat. No. 4,757,348 and Eastman Kodak U.S. Pat. No. 4,987,447. The latter particularly relate to printing job control sheets in the printer itself—bar code printed copy sheets.

By way of example of ink jet printers which may be used for bar code and other indicia printing as described herein, are various commercially available ink jet printers or print heads and drivers. See, e.g., U.S. Pat. Nos. 4,532,530; 4,571,599; and/or 5,036,337.

The following tape background references were located in preliminary background art searches: U.S. Pat. No. 4,770,320 to Miles et al; U.S. Pat. No. 3,691,140 to Silver (a 3M Company patent relating to microspheres for solvent dispersible aerosol spray adhesives) (likewise, U.S. Pat. No. 4,166,152 to Baker et al); U.S. Pat. Nos. 4,895,746 to Mertens; 4,776,575 to Mayer et al; 4,657,960 to Shuman et al; 4,644,026 to Shuman et al; 4,684,685 to Shuman et al; and 4,755,550 to Shuman et al. (All said Shuman et al patents being on re-adhering and removable adhesives by Dennison Mfg. Co.) Also, the following background references were found in a preliminary background art search relating to features such as paper compiling means; tape dispensing means; tape applying means; tape stack ejection means; and output stacking means: U.S. Pat. Nos. 4,151,037 to Klingelhoefer et al; 4,473,425 to Baughman et al; and 4,797,048 to Doery (and see further below). Cassettes or other reels of precut, discrete, tape segments on a release liner tape such as waxed paper tape, are also well known, including tape dispensers for taping rolled engineering drawing copier output, such as in EPO Published Application No. 0 300 742 published 31 Oct. 1990 [D/86292].

Of these references, said U.S. Pat. No. 4,895,746 to Mertens was reported in the search report to be disclosing a stack of aligned sheets in which each sheet includes a backing and a coating of pressure sensitive adhesive on a lower surface of the backing by which the sheet is adhered to the sheet beneath it in the stack. Each of the sheets provides an adhesion with a low release force between the adhesive coating and the upper surface of the adjacent sheet. See, e.g., Col. 1, lines 50–58.

Said U.S. Pat. No. 4,770,320 to Miles et al was reported in the search report to be disclosing a plurality of flexible sheets, each comprising a coating of pressure sensitive adhesive. See, e.g., Col. 7, lines 30–46. This patent appears to relate to the 3M Post-it™ brand Tape Flags, used for place markings, with colored non-adhesive flags portions integral a low tack adhesive portion and dispensed as precut tabs from a manual dispenser. Other patents noted here were cited therein for adhesive examples. [Although 3M Post-it™ brand Note Pads are reportedly the invention of an Mr. Art Fry at 3M, no 3M patent on it by him was found in a Lexpat™ patent search.]

Also noted was a commercial product of removable (low tack) page tabs (Redi-Tag®) somewhat like 3M Post-it™ brand Tape Flags, but with various brief pre-printed notes or instructions on fully very low tack adhesively coated colored flags, dispensed from waxed paper backing strips, from Barbara Thomas Enterprises, Inc., Huntington Beach, Calif. Also, there is a 3M Post-it™ brand "Correction and Cover-up Tape", #658, which is a roll dispensed tape somewhat like masking tape.

U.S. Pat. No. 4,473,425 to Baughman et al was reported in the search report to be disclosing an apparatus and method for binding together a plurality of sheets in which the apparatus comprises an applicator for applying adhesive to the sheets, and means are provided for stacking a plurality of sheets having adhesive thereon. See, e.g., Col. 13, lines 41–48.

U.S. Pat. No. 4,797,048 to Doery, assigned to Xerox Corporation, was reported to be disclosing an apparatus which binds a set of sheets by applying an adhesive thereon, with means for holding the set of sheets.

U.S. Pat. No. 4,151,037 to Klingelhoefer et al was reported to be disclosing a device for applying binding strips to stacks of paper, comprised of an application station wherein a binding strip supplied by a feed device can be applied to the stacks of paper.

Of particular interest, U.S. Pat. No. 4,946,154 issued Aug. 7, 1990 to T. Nakamura (assigned to Fuji Xerox) was also noted, as schematically disclosing a copying machine with an apparatus for either automatically staple binding or automatically paper clipping the output sets of copies together in a compiler. [Other references are noted therein in Col. 2 for applying paper clips or clamps, and some disadvantages of staples are noted there.]

As to specific hardware components of the exemplary apparatus hereinbelow, it will be appreciated that, as is normally the case, some such specific hardware components or suitable alternatives are known perse in other apparatus or applications. For example, it is known to provide automatic taping or strapping machines, including roll dispensers and cutters, for various other different applications, as shown in various of the above and other references and devices. Also, various copier or printer compilers, for stapling and/or gluing output sets, are well know and need not be described herein.

For some examples of modern copier or printer compilers, and "mailboxing" job allocations of compiled and bound [stapled in that application] job sets into "mailbox" bins, see allowed U.S. application Ser. No. 07/647,333 (Xerox Corporation D/88157 filed Jan. 25, 1991) by B. Mandel and art cited therein. Other mailbox art includes U.S. Pat. Nos. 4,470,356 and 4,437,660, with lockboxes; U.S. Defensive Publication No. T102,102 entitled "Access Controlled Copier" published Aug. 3, 1982 by Albert Bolle, et. al.; and Xerox Corporation EPO Publication No. 0 241 273 entitled "Limited Access Reproducing Machine Bins", published Oct. 14, 1987.

Further specific features, individually or in combination, are disclosed in the claims and in the specific embodiments disclosed herein.

All references cited in this specification, and their references, are incorporated by reference herein where appropriate for appropriate teachings of additional or alternative details, features, and/or technical background.

Various of the above-mentioned and further features and advantages will be apparent from the specific articles, methods and apparatus and its operation described in the examples below, as well as the claims. Thus, the present invention will be better understood from this description of embodiments thereof, including the drawing figures (approximately to scale) wherein:

Describing now in further detail the exemplary embodiments with reference to the Figures, there are shown plural outputted printed copy sheets 11 temporarily but securely bound together in integral stacked job sets 10 in accordance with the present system. In each set 10 the plural sheets 11 thereof are temporarily, removably, bond as a set only by small, removable, low tack tape binder strips 12 (FIGS. 1 and 2) or 13 (FIG. 3) partially wrapped around opposing sides of the set 10. The sets 10 to be bound may vary widely in thickness. These sets 10 may be the sequential output of various collated sets or other jobs of any printer or copier, such as 20. Preferably the closest together or long side edges of the sheets are so taped, but alternatively the opposing short side edges may be so taped. In particular, if the copy sets 10 will include tabed sheets, since the tabs will be on a long edge side, in that case a system for taping the short edge sides is preferred.

Figure 4:
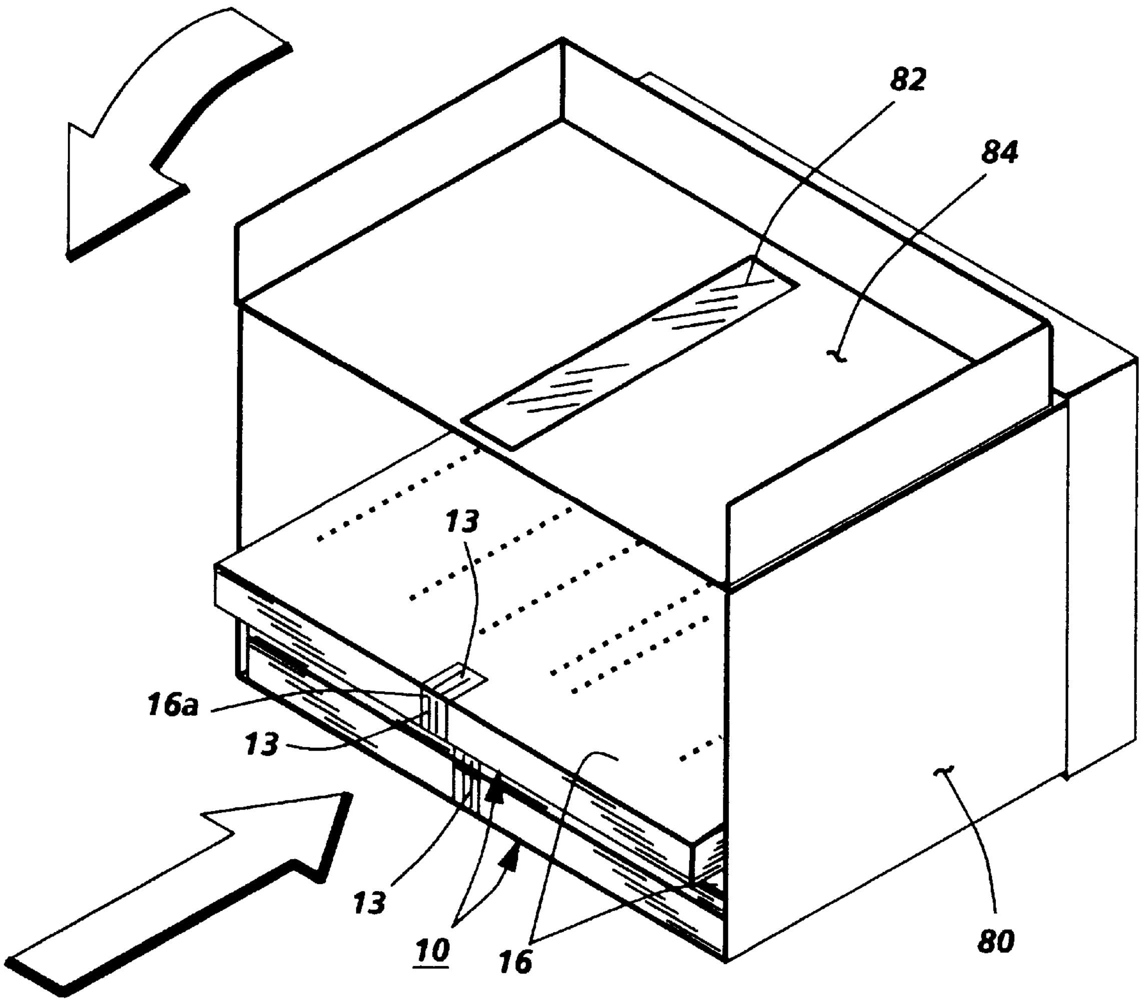
FIG. 4 is a perspective view of a stack of several such temporarily bound and marked copy output sets, such as the embodiment of FIG. 3, of different set thicknesses (numbers of sheets), in an exemplary stacking container.

With the disclosed system, the various such temporarily bound sets 10 can be commonly stacked together, directly superposed, as in FIG. 4, yet the individual sets 10 may be readily identified and separated from one another, without interference, confusion or damage. The sets 10 may be stacked together directly superposed (without set offsetting) in a shared container, or a common printer or copier output tray. Well known stack edge alignment maintenance means, such as side guides or walls or tampers may be provided.

Discretely packaging selected output sets 10 of a printer or copier 20 output copy paper 11 with removable tape strips 12 or 13 on opposing edges 10*a* and 10*b* of each of selected output set 10 provides a low cost, simple, method for preserving the integrity of these stacks 10 of paper 11 in a manner which makes these stacks 10 easy to handle, yet allows them to be subsequently easy separated into their individual sheets or pages 11 with no evidence of binding left on the pages. In the following discussion, the description of the tape 12 will also apply to the more adhesive tape 13 unless indicated otherwise, and either may be bar coded or otherwise encoded as described herein, or otherwise.

The integral set 10 maintains its integrity and protects the individual sheets 11 therein from unfolding or skewing or tearing off during any desired subsequent distribution and/or handling. Yet after distribution and/or handling the individual sheets 11 of the set 10 may be completely freed from one another without any residual marking or damage by simply lifting and removing the low tack tape binder strips 12, or tear removing the strips 13, as will be further described. Unlike staples, clips and other such typical present "temporary" binders, none of the individual sheets 11 of the set 10 ever need to have holes, marks, creases or damage, and there is no metal refuse incompatible with paper recycling and potentially damaging to a printer or copier. The sheets 11 are in the same condition after unbinding as they were before being bound by the tape strips 12 or 13.

In particular, there is disclosed in the embodiment example herein an improved, low cost, system and method by which plural copy sheet 11 sets 10 may be temporarily "bound" together and thus separated from other jobs by each set 10 being centrally partially wrapped around opposing edges 10*a* and 10*b* with very small paper tape tabs or strips 12 or 13 relative to the sheet size. For most jobs the binding tape tabs 12 are preferably coated on selected areas 12*a* of one side thereof with a low tack (low removal force) adhesive 14. (The tape strips 13 here are coated with a more aggressive adhesive).

As shown, one only needs to partially tape-bind very small areas of the top and bottom sheets, 16 and 18 with the tape tabs 12 or 13. Yet by wrapping only one tape segment 12 or 13 around each of two opposing edges 10*a* and 10*b* of the set stack 10, with adhesion of each tab 12 only to small opposing edge areas of the top and bottom sheets 16 and 18 of the set 10, it has been found that the whole multiple-sheet job stack 10 can be held together just by these two tape tabs, yet easily separated at any time, by the tabs 12 being peeled off, without any sheet damage, unlike staples or other such permanent binders.

Preferably unbinding is accomplished in most cases by lifting at least one side of the two tape tabs 12 [not 13] on at least one side of a set 10. That is, the tape tabs 12 are lifted off of at least one of the top or bottom sheets 16 or 18. Preferably this is assisted by providing unglued (non-adhesive) pull-off tab portions 12*b*, discussed below. Lifting or pulling on these non-adhesive tab portions 12*b* lifts the tape 12 away from the cover sheet to which it was adhered by low tack adhesive 14.

As shown, these tabs 12 may be dispensed, as unwound and cut off (or torn off) segments from a tape roll, or the like. A low tack tape adhesive can be used, like that of small 3M Post-it™ brand Note Pads or 3M Post-It™ brand Tape Flags, or any other suitable low-tack adhesives. [Exemplary Patents re 3M Post-it™ and other low tack adhesive tape examples are noted hereinabove.]

Figure 2:
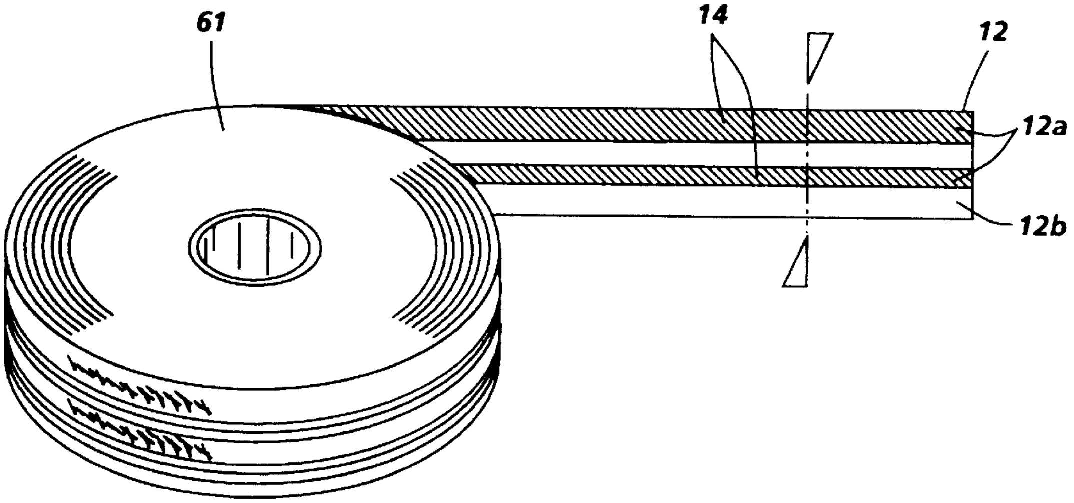
FIG. 2 is a perspective view of one example of a tape roll supply from which the exemplary binder strip tape segments such as shown in FIG. 1 may be cut.

One example of a tape 12 suitable for the present system, shown in FIG. 2 is a pre-wound, easily unwindable, easily cutable, paper roll tape comprising a recyclable colored paper substrate, generally similar to conventional 20 pound bond copy paper, and readily printable, with a sufficiently low-tack adhesive 14 applied to one side thereof, in areas 12*a*. This low-tack adhesive 14 should be sufficiently low-tack as not to lift either the copy paper surface or toner images thereon. The adhesive 14 is also preferably one which will not interact with the styrenes or plasticizers in xerographic systems toner images so as to noticeably remove them or permanently adhere to them. [Note, however, that in embodiment 13 that a thicker (heavier paper weight) tape 13 substrate and a stronger (more aggressive) adhesive and their adhesion to other cover sheets may be desirable for better binding of especially thick sets of sheets (see infra).]

As an additional feature, the adhesive areas 12*a* of the binding tape preferably do not run all the way out to (at least one) edge of the tape, i.e., not covering area 12*b*, so that the tape 12 may be readily lifted off of the sheets to which it is temporarily adhered. That is, preferably the low tack adhesive 14 is applied to the tape except in a designated lift up edge area 12*b*. These non-adhesive areas or segments 12*b* of the tape may also be marked or indicated on the opposite (front) side of the tape with printed removal instructions, such as "lift here," or the like. That is, preferably each tape segment 12 has easily liftable adhesive void or "killed" (covered) areas or strips forming non-adhesive edge areas 12*b*, which are also preferably so marked and/or colored on the other, visible, side.

To express this another way, even though the whole binding "tape" piece or segment 12 with a low tack adhesive 14 is easily removable, e.g., by scratching or lifting a corner of the tape 12 with a finger nail, this can be assisted to help get this tape removal started. There are several such means which may be implemented at little or no cost. In particular, as noted, the adhesive may be effectively applied to only a portion 12*a* of the tape, leaving a part 12*b* of the tape without effective adhesive. With this design, one can even obtain a lifted tape corner to pull on merely by flexing the stack 10 slightly. An additional optional aid for more easily removing the binding tape or strip is to provide crimping, notching, or pre-curling of the tape near a corner to assist lifting the corner of the tape with a finger or fingernail in that area.

One example of one way to render selected edge areas of the tape non-adhesive or much less adhesive is to start with existing low tack adhesive tape, such as "Post-it"™ type tape or drafting tape. A commerically available mixture of water with a small amount of methanol and detergent can be mixed with "Sylox 2"™ silica powder material and food coloring, and that mixture applied with a rubber roller to the selected edge area of the non-sticky side of the tape, the tape dried, then stacking up strips thereof. The food coloring dye marks the paper, the liquid evaporates and the silica powder (now colored) remains on the surface of the paper side until covered by another strip of tape. The silica powder then transfers to the adhesive, serving as a buffer making it non-sticky along that edge, otherwise known as "killing" the adhesive there.

While labels on release liner technology provides very precise labels, they are expensive due to the materials and manufacturing cost. In applications where preprinted labels of precise dimensions and graphic registration are not required, the cost of the release liner and their fabrication can be eliminated. Low tack adhesive can be used to eliminate the need for either release liners or webs such as wax paper, or "backsizing" on the nonadhesive side of a rolled tape. Aggressive adhesive may require either a release liner or "backsize" nonstick coating on the nonadhesive side in order to unroll the tape. Backsizing may interfere with printing onto the tape, so tapes with aggressive adhesive should preferably be printed before the backsize is applied, or include a release liner. Paper tapes from Anchor Continental in Columbia, S.C., with low tack gum adhesive, and no backsize, have been found to unroll satisfactorily, and to not lift toner from xerographic copies to which such tape is applied. Water soluble adhesives are preferable from a paper recycleability standpoint.

Low tack pressure sensitive adhesives for tape can be fabricated using at least two processes. 3M "Post-it"™ products apparently depend on an adhesive polymer which has the desired stickiness based on controlled chemical processes such as molecular structure and plasticizer additives. An alternative process controls the tack of more commonly used pressure sensitive adhesives by a more physical process. Specifically, a fine powder (such as talc or silica) can be mixed into the adhesive to provide microscopic lumps which limit the surface contact and the structural integrity of the adhesive in the bond. Furthermore, powders such as talc have long been used to "kill" the adhesives on portions of a surface so that the areas where bonding does not occur can be produced by application of the powder. The adhesive is effectively "killed" because the powder provides a buffer between the adhesive and the mating surface.

Another way is suggested here for producing rolls of tape which has low tack adhesive, or for producing tape which has more aggressive adhesive for other applications. Apparatus which dispenses pressure sensitive tapes by use of opposing drive rollers may suffer from adhesive buildup on the rollers which contact the adhesive. Furthermore, adhesion of the tape to the feed rollers can cause problems with reliability and accuracy of the tape dispensing. Therefore, it is desirable to provide tape which is void of adhesive in the area which comes in contact with the drive rollers. As noted, it is also desirable, if the tape is to be removed after application, to provide an edge or a corner which is void of adhesive. This allows the tape to be grasped for easy removal. Large diameter rolls of wide tape stock can be cost effective to produce with a continuous coating of adhesive. This wide roll stock may be provided for a conversion, which involves (1) appropriate "killing" of the adhesive in selected strips, or not applying adhesive in those strips, prior to (2) slitting it to appropriate narrow widths, and (3) winding it into appropriately small rolls for the finished product. Printing the nonadhesive side may also be a part of the process. The adhesive may be voided or "killed" along a central stripe area extending along the tape web where the tape will contact drive rollers, and also along one edge so that tape can be lifted for easy removal. As short segments are subsequently cut off of this finished tape for set binding, and wrapped transversely of the tape web dimension, said one edge of each segment will then become one end of each segment, providing for removal assistance.

As noted, one method for "killing" the adhesive uses the previously described properties of powder applied to the adhesive. Aerosol sized particles of fumed silica gel such as "Syloid"™ or "Sylox"™ manufactured by Davison Chemical division of W. R. Grace company may be used. These powders are easily suspended in any liquid such as water, alcohol, or organic solvents. The liquid vehicle is chosen for compatibility with the adhesive and substrate, and for volatility such that it can be evaporated prior to rolling the slit tape onto takeup rolls. This provides an inexpensive means of precisely metering the powder onto controlled areas of the tape by using the same technology and apparatus that converters use for coating, laminating and printing ordinary tape. Another possible way is to use Syloid in a waxy base with a volatile solvent to kill the adhesive in the selected zone.

As noted, there are various ways in which the binding tape segments 12 may be desirably pre-printed or on-line printed to display various information, if desired. For example, they tapes may be commonly pre-printed with instructional information such as "Flex stack to remove tape", and/or promotional information such as "AAA Copy Shop—Phone (123) 456–7890". Alternatively or additionally the respective tape segments 12 for different sets may be differently printed, as job and/or distribution identifiers. For example, by means of a dedicated on-line printing device such as a dot matrix or ink jet print head, printing information about the print job that tape segment will bind into that set 10 (information on and descriptive of the stack to which that printed tape segment is to be attached). For example, such printed tape legends as: "M. Meetze/Document ABC No. 33/13:47:53 Jun. 26, 1992", and/or machine readable indicia. This can be used to replace or supplement a printed and/or bar coded (or other machine readable indicia) job cover sheet.

Irrespective of the particular application, the basic steps which may be used to bind a set 10 here may desirably be to: (1) compile the paper 11 into a neat stack; (2) dispense the adhesive binder tape for or at opposing edges of the stack; (3) apply tape strips 12 onto opposing edges of the stack, which may be by cutting the strips (tape segments) from supply rolls; (preferably, the tape segments are applied substantially centrally of the two longest, and thus most closely adjacent, sides of the stack) and (4) eject the taped stack 10 from the compiler area, and, desirably; (5) accumulate (stack) the taped sets in a stacker. Then the taped sets may be easily separately identified and separated for handling and distribution relative to other sets.

The sheets within each taped set are very resistant to sheet skewing, sheet fanning (lateral or vertical), or other sheet misalignment relative to the other sheets in the set, more so resistant than even most stapled sets.

If the tape segments are to be applied automatically rather than manually, as desired, various apparatus or units may be utilized. The tape applying apparatus or system may be utilized in either a standalone accessory unit or an on-line unit. The on-line unit may even desirably partially utilize an existing compiler and/or finisher. In either such tape binding unit the set can be bound automatically as disclosed upon insertion of the set into the unit, by triggering a set input switch or the like. If sheets are fed sequentially to the binding unit and accumulated therein in a compiling tray or the like before binding, a completed set signal can be provided from the copier or printer to indicate that binding should be done for that set prior to receipt of the next set. Alternatively, the tape binder may be actuated in response to a sufficient time delay after the receipt of the last sheet (prior to the receipt of another sheet), which time delay would correspond to the end of one job. i.e., a simple user adjustable timing element could recognize the end of a job by the passage of a preset time between detected sheets entering the binding unit, and when enough time has passed to indicate the end of the job, the binding mechanism would be automatically activated. If desired, a sheet buffer can temporarily store or delay any new sheet or sheets from entering the binding unit while the binding mechanism is in operation. Since, with this system, the binding is temporary and nondestructive, there is no permanent damage due to an improper binding. The only outcome of inadvertent extra binds is the inadvertent segmentation of a job into plural separately bound stacks [sub-sets].

Various apparatus can be used for applying the binding tape segments. Simple feed rollers can appropriately advance a tape segment from any of various types of roll stocks. A tape may be fed up parallel to the stack edge, but may preferably be fed transverse to the stack edge. In one system, the stack may be clamped, the tape may be fed for a desired segmental length by one roller, which can also press or stick the tape to one side of the stack at its free end, while another roller positioned in accordance with the thickness of the stack moves the tape across the other side of the stack and across a cutting blade.

However, the present system is not limited to rolled stock tape dispensing. Pre-cut tape segments can be packaged in dispensing cassettes with a release liner paper or plastic backing on the adhesive side, as is known for other tape or label dispensers.

One exemplary on-line automatic tape binding system utilizes a more vertical arrangement for compiling the paper for binding the output of a marking engine such as a printer or copier. It may incorporate a relatively simple mechanism for transporting the bound output to an output tray above the compiling mechanism for convenient access by the operator and a savings in horizontal "footprint". It lends itself to a modular finisher accessory for existing printers and copiers, and thus has application as a modular accessory product as well as an architecture for the finisher part of an integrated system. It may incorporate the following elements: (1) an initial page receiving tray or baffle which is sloped sufficiently for gravity to feed the output sheets into (2) a greater sloping (more nearly vertical) compiling tray which has edge guiding means to "funnel" the pages into a neat stack therein, and (3) binding means (which may bind the stack with staples or glue, as well as tape, as previously disclosed), and (4) means to move the bound stack out of the compiling and binding tray into a path for transportation, and (5) bound set transporting means for moving the bound stack upwards, which may comprise a belt or a number of pairs of rollers which move the bound stacks up to (6) an output tray which is generally located above the initial page receiving tray, while the compiling tray is receiving pages of a new stack to be bound.

Figure 1:
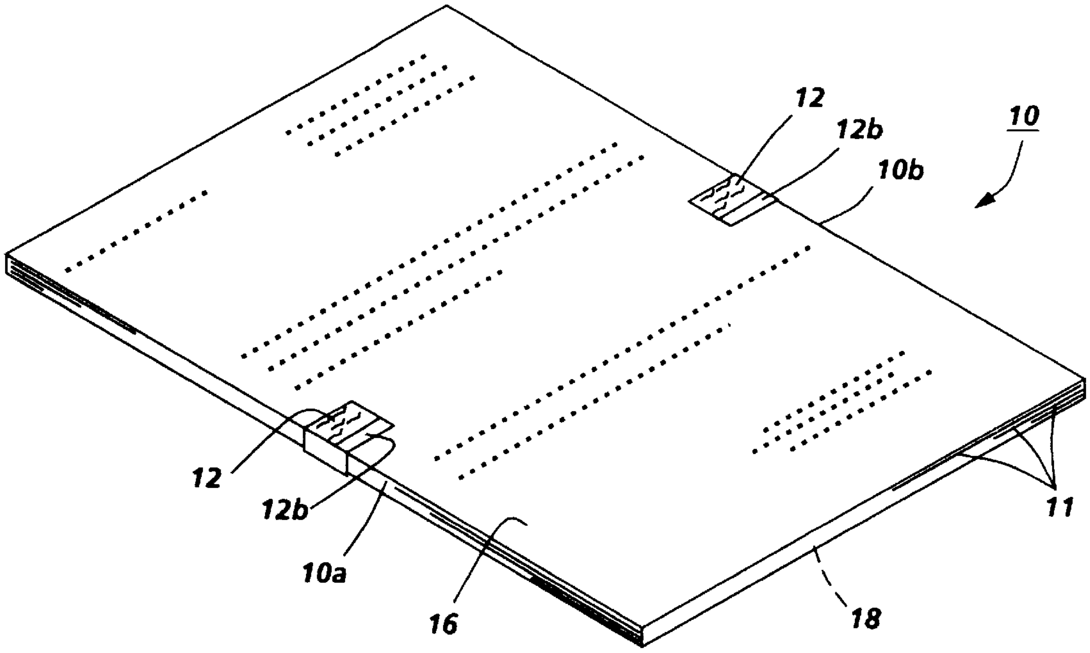
FIG. 1 is a perspective view of one exemplary set of outputted copy sheets temporarily bound together in an integral stack in accordance with one embodiment of the present system. The exemplary tape binder strips in this example are removably tacked to the top and bottom sheet of the set with a low tack adhesive thereon, and these tape segments also have marked (indicated) non-adhesive lift areas.
Figure 6:
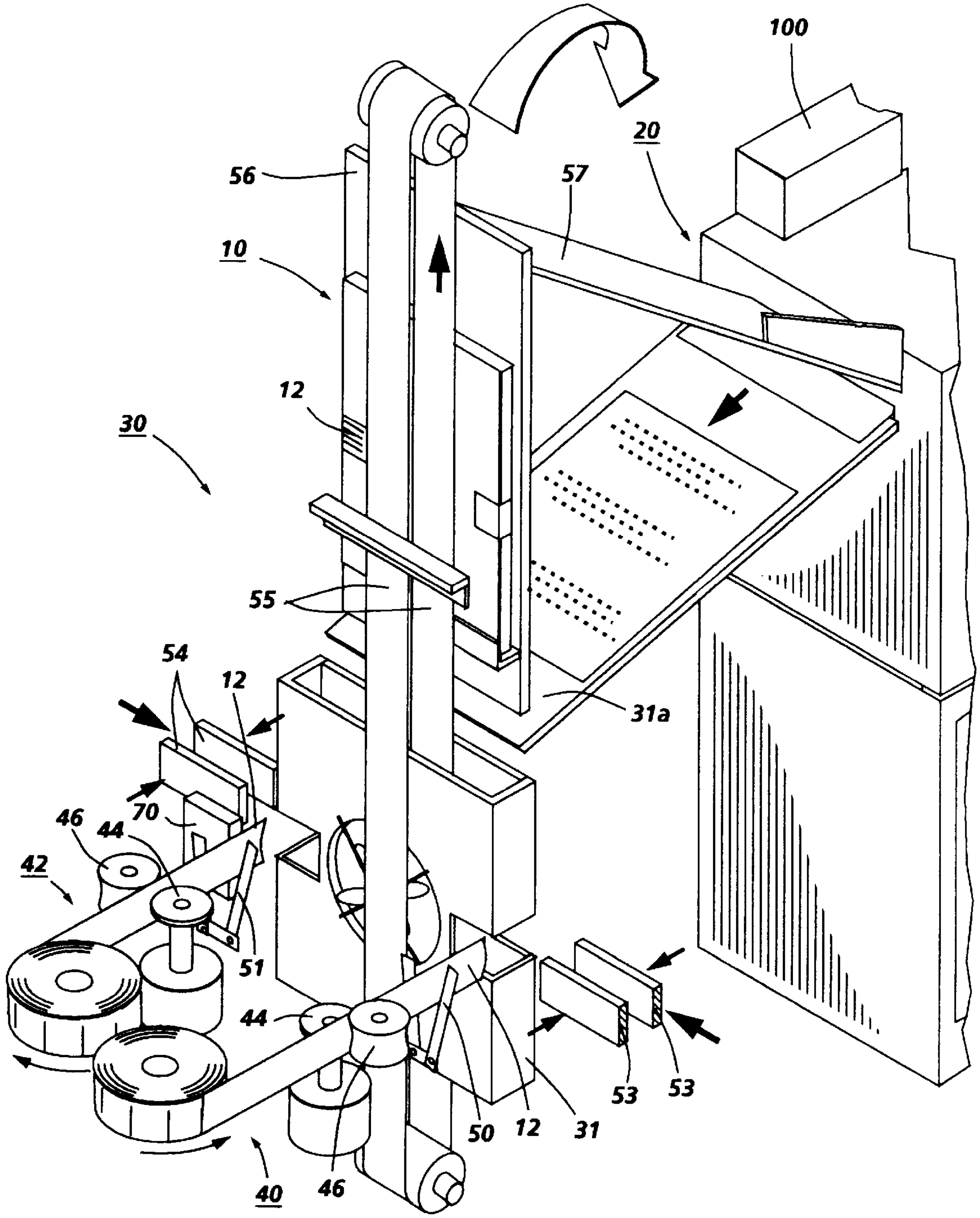
FIG. 6 is a perspective schematic view of one embodiment of an exemplary binding system for automatically applying exemplary tape binder strips to form temporarily bound sets as in FIGS. 1 or 3, from tape as in FIG. 2 or the like, and for stacking these sets as in FIG. 3; associated with and utilizing as a sheet input one example of an existing copier or printer.

Turning to FIG. 6, this is a simplified perspective view of one such embodiment of an exemplary binding system 30 for automatically applying exemplary tape binder strips 12 or 13 to a stacked copy sheet set or job 10 to form the temporarily bound sets as in FIGS. 1 and 2. This is preferably a simple modular binding unit 30 wheeled up or docked with the normal output of an existing copier or printer 20 to receive its normal output of sequential printed copy sheets 11 (which are preferably precollated, as is well known).

In this exemplary binding apparatus 30 for automatically sequentially binding sets 10 illustrated in FIG. 6, a vertical compiler tray 31 is located at the output of the copier or printer 20. [Preferably the compiler tray 31 is located with an optional path thereto such as input baffles 31*a* extending from below the present conventional output tray of the copier or printer.] The vertical compilertray 31 can be adapted to receive the output sheets sequentially (one at a time), or in a complete set dumped all at once from an upstream compiler in copier or printer 20, or from a sorter bin or output tray. Optionally or additionally, a set (and/or set cover sheets) may be manually inserted into compiler tray 31 instead of from copier or printer 20.

Two tape dispensing means 40 and 42 are provided at opposite edges of the compiler 31. Both tape dispensing means 40 and 42 incorporate pairs of feed rollers 44, 46. The feed rollers 44 here are thin edged, for minimal contact with the sticky side of the tape, and positioned to engage a non-adhesive or killed stripe running centrally of the tape, as previously described. The feed rollers 46 provided here are concave for engaging the other (non-sticky) side of the tape. This opposing roller 46 on the non-sticky side is wider and has a concave profile to give a "belly" or transverse curve to the tape for beam strength in transporting it to the cutting and applying mechanisms. The dispensing means 40, 42 preferably incorporates sensors or timers and/or stepper motor drive for the desired incremental tape segment movement, or other such measuring means for controlling the amount of tape dispensed. (Such means are well known in the tape dispensing art, and need not be described herein.) The length of tape fed is not critical and may be a preset constant length suitable for binding the largest (thickest) set to be compiled in the particular compiler 31.

As schematically shown in this example, two scissors like tape cutting means 50, 51 [or any suitable knife or chopper mechanism], cooperating with two pairs of tape applying means 53, 54, cut a tape segment 12. The tape applying means 53, 54 sticks the tape to the front and back side of the compiled set, preferably after it has been temporarily clamped at that point. The finger like tape applying means 53, 54 here are respectively located on opposite edges of the compiler 31 so as to deflect the binder tape 12 around to the back of the copy set 10 when the tape is dispensed. A separate set clamping means may be provided in connection with the compilertray 31, as by moving one wall thereof, or the tape applying means 53, 54 can also provide the clamping function here All of the elements of the exemplary automatic binding system 30 may be operated by a motor and cam system in a conventional manner. As previously noted, there are many other automatic tape applying systems known in the art which can be used. The compiling and/or set clamping for taping may be assisted, if desired, by a low air pressure fan to blow the paper to one side wall or the other of the compiler, to facilitate stacking without stubbing an incoming sheet on those sheets which have previously entered the compiler. Two such (selectively alternatively operable) fans, one on either side, can provide the option of 1-to-N or N-to-1 sheet stacking for either add-on or general purpose units.

Additionally, if desired, as illustrated for this binding system 30, a set elevator means such as the elevator belt 55 and baffle 56 may be provided for raising the now taped set up to be stacked in an output tray 57. i.e., automatically lifting, ejecting and stacking the set after it has been taped. The elevator belt 55 may have projecting shelves, hooks, legs or pins to assist the set 10 lifting. This output tray 57 is shown here conveniently located at operator height above the compiler tray 31, but it will be appreciated that this may be in any desired location.

If plural, individually selectable, sorter trays or "mailbox" bins are desired instead of a single stacking tray 57, this can be conventionally provided by selectively actuating or moving a bin entrance gate adjacent the selected bin entrance of a vertical bin array adjacent the belt 55 path, to deflect the bound set 10 from the belt 55 path into the selected bin, as is well know for various sorters. This bin selection may be done automatically in response to machine reading the encoded tape edge of each job set.

Alternatively, a taped set may be automatically dropped out of the bottom of the compiler tray 31, and allowed to slide out by gravity into another tray or trays below compilertray 31, by a "trap door" or other such arrangement. Or, as well known per se, the compiler tray 31 may be horizontal, with an open top into which sheets are stacked, and a false bottom or trap door which allows the sets to drop onto a set stacking means after they have been tape bound. Or, the generally vertical compiler tray 31 may simply pivot out horizontally after the binding to unload the taped set onto an adjacent stacking surface.

Figure 7:
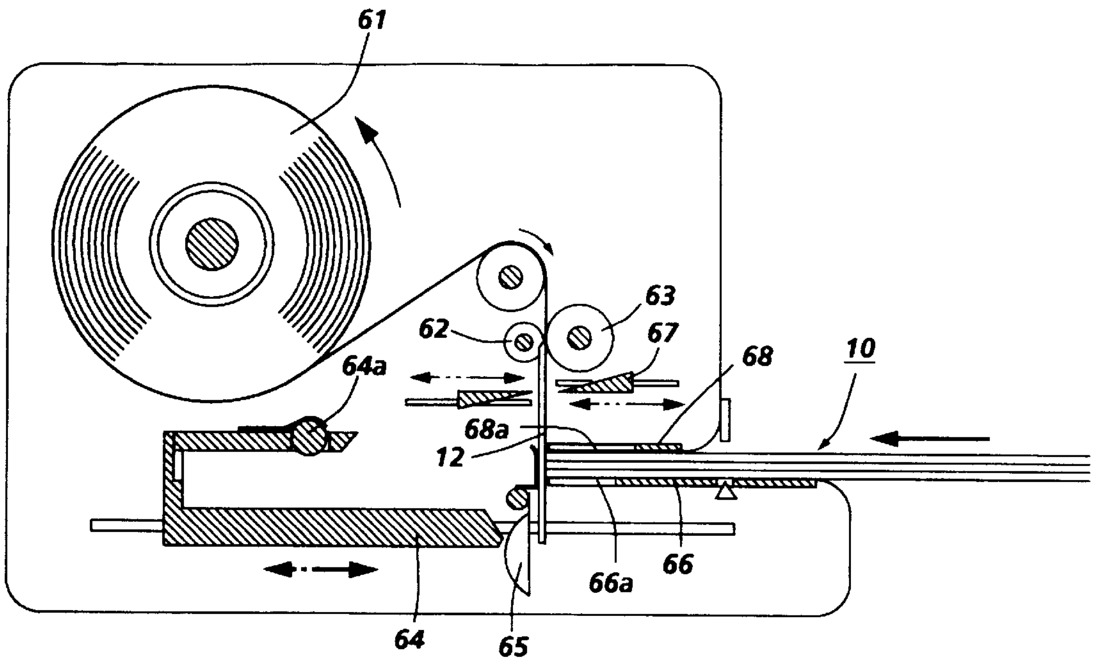
FIGS. 7–10 are otherwise identical schematic side views, shown in different sequential operating positions, of another, portable, tape binding embodiment.
Figure 8:
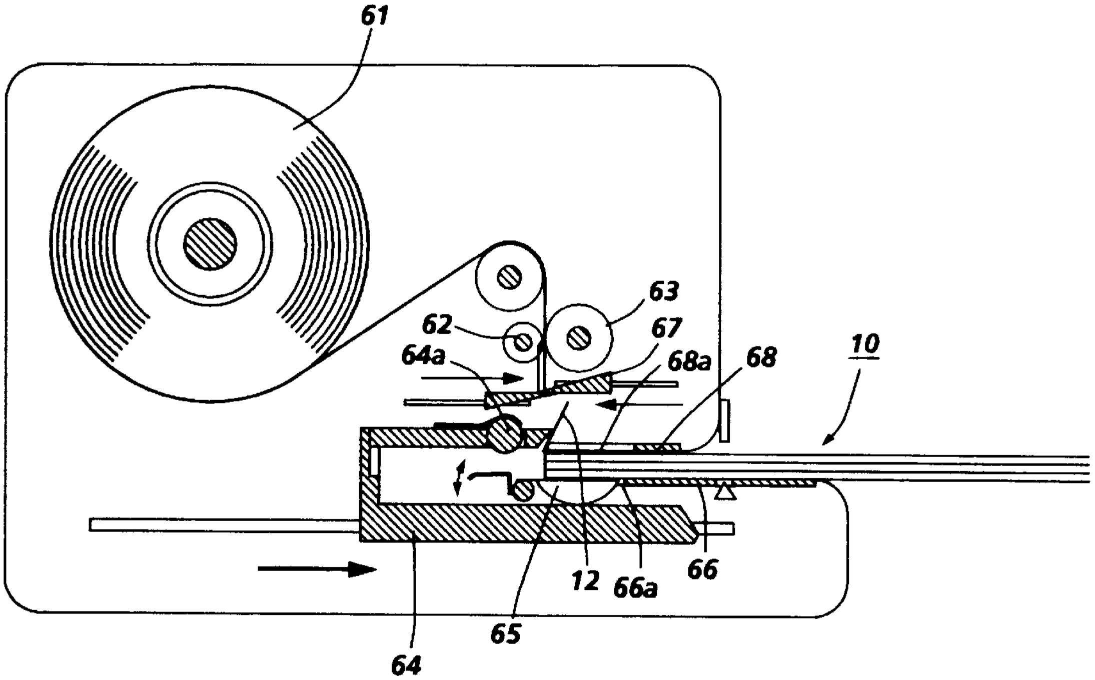
Figure 9:
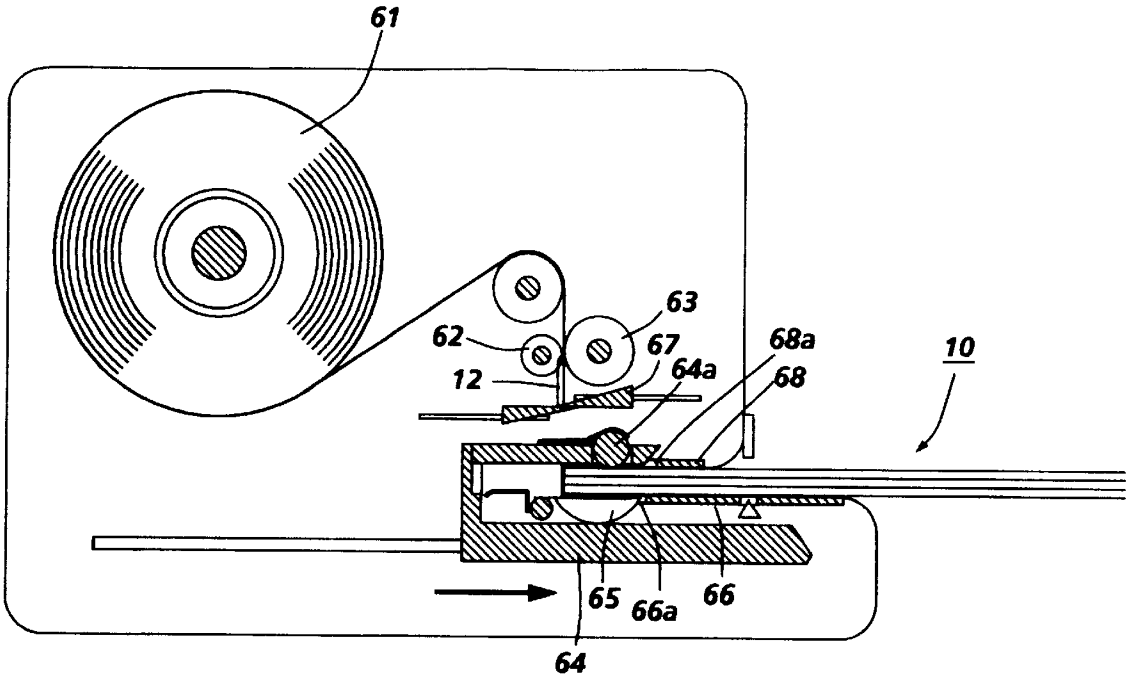
Figure 10:
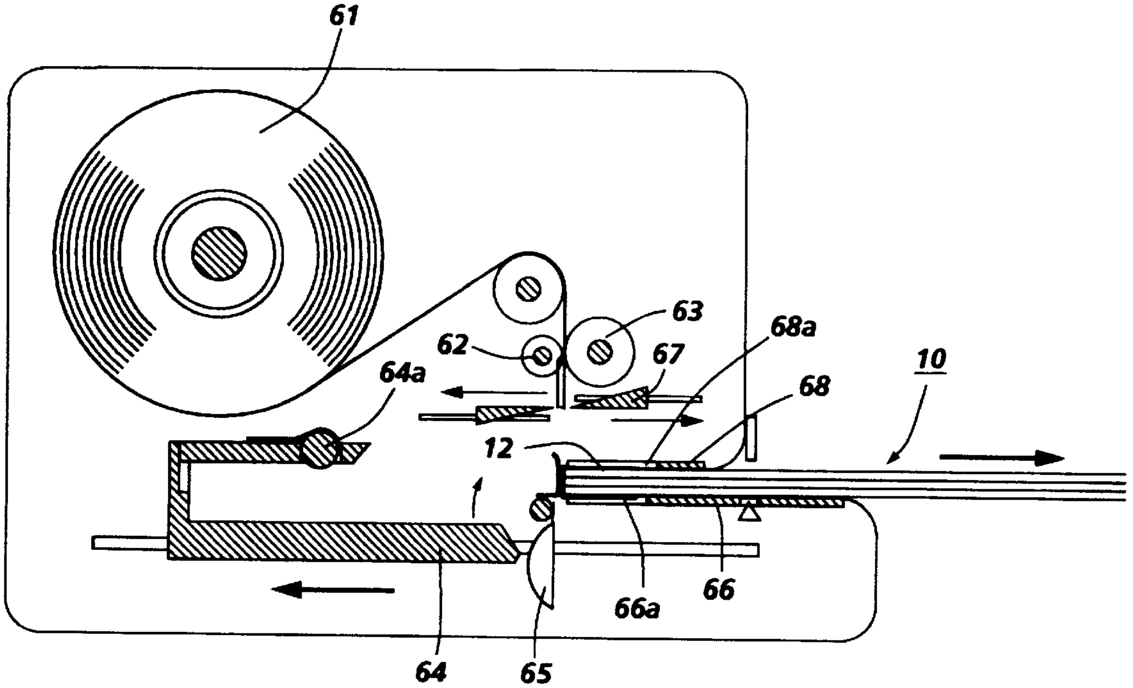

Referring now to another, portable, tape binding embodiment 60 schematically represented in FIGS. 7–10, roll stock 61 tape 12 with a low tack adhesive (as previously described) is driven (fed out) by feed rollers 62, 63 to the position shown in FIG. 7 (past the edge of the multi-page document set 10 to be bound). When a set 10 is sensed as inserted in the device 60 by a conventional gate switch or optical sensor, a moving element 64 drives an articulating cam 65 pivotally up through a slot **66*a* in the set supporting base plate 66 to stick the lead edge of the tape 61 segment 12 to the bottom of the set 10, as shown in FIG. 8. Then, or simultaneously, a scissor like cutting device 67 cuts the tape off above the set 10. Then, as shown in FIG. 9, further travel of the moving element 64 towards the set 10 carries a spring loaded roller 64*a* thereon through a slot 68*a* in the top plate 68 to stick the upper end of the tape segment 12 onto the top of the set 10. FIG. 10 is after the tape application is thus completed and moving element 64 retracted again. The taped set 10 may then be removed from the device 60, the feed rollers 62, 63 will dispense more tape (another segment) for the next application, and the user may rotate and reinsert the other edge of the set 10** to tape that other edge.

Figure 11:
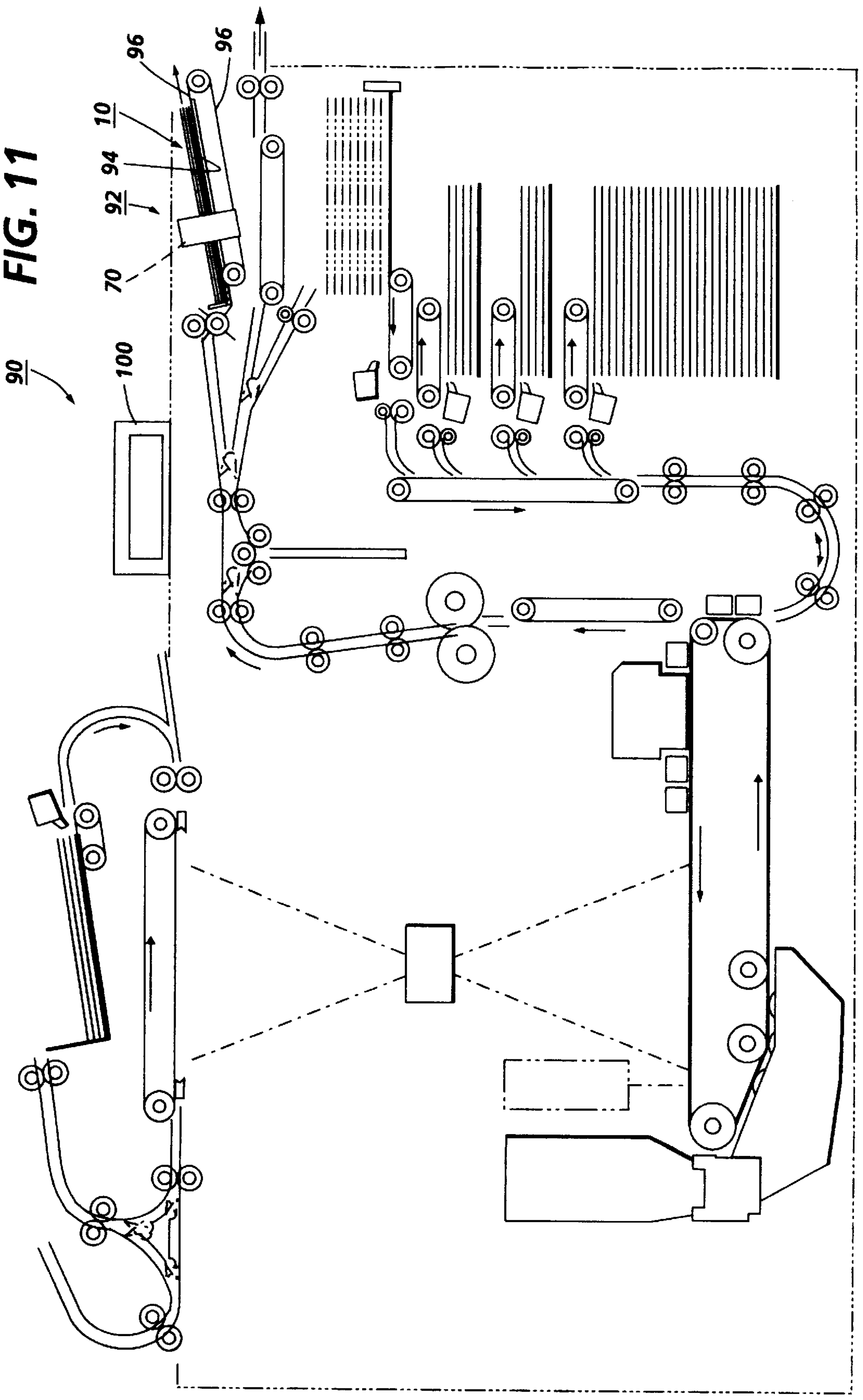
FIG. 11 is a schematic side view of one exemplary copier with an integral compiler/tape binder/printer, wherein the copy output sets are stacked and bound in accordance with the present system inside a compiler tray inside the copier.

Disclosed in FIGS. 6 and 11 as one example of an integral on-line tape printing feature which may desirably be provided, is an otherwise conventional ink jet print head 70, associated with the tape dispenser, which may be programmed to print any desired instructional or advertising message on the tape in coordination with the printer job controller. This print head 70 may be located wherever appropriate in the tape dispensing path. If the tape profile is concave as it is being unwound or dispensed, the print head 70 may be made corresponding convex to fit against the tape profile at that point. The tape head 70 may if desired be provided with print control information in a conventional manner from the same controller 100 controlling the copier or printer 20, including its job input and control and its job covers insertion control.

Shared (network) printers have the problem that a substantial amount of time and system resources are consumed in the process of receiving and processing data for every page which is to be printed. This bottleneck is even more apparent for color products. Thus, the printing engine is idle during long periods, even when there are jobs in the queue. This and other expected delays of unknown duration lead users to delay in going to the printer to pick up their jobs, and this increases the users' burden of sorting through the accumulated loose paper output, even if different printer output bins or "mailboxes" are provided for different users or jobs. Automatically packaging the outputs in accordance with the system herein can reduce the time and effort in separating or sorting the different job outputs.

Copiers with sorters in a medium speed class also have some of these same problems when they are shared by many users. Making even ten collated sets of twenty pages can take almost ten minutes, and a typical secretary may not want to stay to wait for the job to be complete. The operator may want to go away and return to pick up the job. Meanwhile, another operator may arrive to start a new job before the first one clears the sorter bins. This imposes a requirement to remove and stack another persons job before another sorter collating job can be undertaken. Thus, automatically tape packaging the output and stacking it can also be desirable in such copiers.

High volume printers and duplicators can pump out four reams of loose paper every 15 minutes or so (unless the sets are stapled or stitched). Many jobs are needed without staples, and also stapled sets are typically limited to 100 sheets or less. As previously noted, slip sheets and/or offsetting are commonly used, but are not robust in maintaining set integrity and have other deficiencies.

Data Centers and Print Shops must handle large quantities of loose sets of paper from different jobs, and different customers, and often with different printers, which is difficult to accurately keep track of. This disclosed system of individually coding jobs sets 10 by printing discrete job tickets on the tape 12 thereon is particularly suitable therefor, as it is for networked or otherwise shared printers or copiers.

In particular, in those or other applications where job encoding and tracking is desired, the printer or copier can also automatically provide discrete or common special front 16 and back 18 cover sheets (preferably of heavier paper stock) as the top and bottom sheets for each set 10 which is to be packaged. These cover sheets 16 and/or 18 can become a part of the set packaging and may be considered to be disposable, i.e, in this particular case the top and bottom sheets 16 and 18 of the set 10 are only job information or identification bearing, not job image bearing. These set packaging cover sheets may be provided in addition to (on top of) any covers required for the print job itself. Each pair of set packaging cover sheets 16, 18 can be printed with a unique bar code such as **16*a*, 18*a*, if desired. This bar or other discrete readable encoding can be printed by the printer 20 itself. See, for example, the above-noted Xerox Corporation Rourke U.S. Pat. No. 4,970,554, Rourke et al U.S. Pat. No. 4,757,348 and Eastman Kodak U.S. Pat. No. 4,987,447 Examples of patents on cover sheet insertion in copiers include U.S. Pat. Nos. 4,961,092, 4,602,775, 4,640,607, 4,763,161, 4,924,265 and 4,330,197 (Col. 5, lines 55–58, and tray 108 in the Figure). Other art on this subject includes U.S. Pat. Nos. 4,248,525 and 4,893,153. If desired, the copier or printer controller, which is of course programmed with the number of sheets to be printed in a particular job set, can be software programmed to automatically feed into the normal output copies stream, at the correct intervals [see, e.g., the cited covers inserts patents], a card stock sheet or other heavier than normal sheet of the same size as the normal output copies, to provide a stronger top and/or bottom sheet for each job set, in response to a job set of more than 50 sheets or so. This signal can also, if desired, instruct the tape binder mechanism to switch to dispensing a more aggressive tape to bond to these heavier cover sheets. Thus, a stronger temporary binding can be automatically provided for thicker, heavier, job sets. The bar code identity can also be stored into a personal computer (PC) database, along with any desired information about the job set contained between the covers 16, 18. The finisher (which may be fed from a batch feeder or from the printer itself) can read the cover sheet bar code 16***a* as the set 10 is being compiled, and a segment of tape 12 can be printed with a duplicate bar code by a dedicated print head (such as an ink jet 70). When the end-of-set or bottom cover sheet is added to the compiled job stack, the finisher can apply this coded tape segment 12 to opposing edges of the set 10. Thus the tape on at least one edge of each set may have a unique bar code, and it may match that on a cover sheet 16 and/or 18 of that set, if desired. At this point, such a job set has both structural integrity and a unique identity which can be read by machines or people (people can read a full description of the set printed on the cover sheet).

Figure 5:
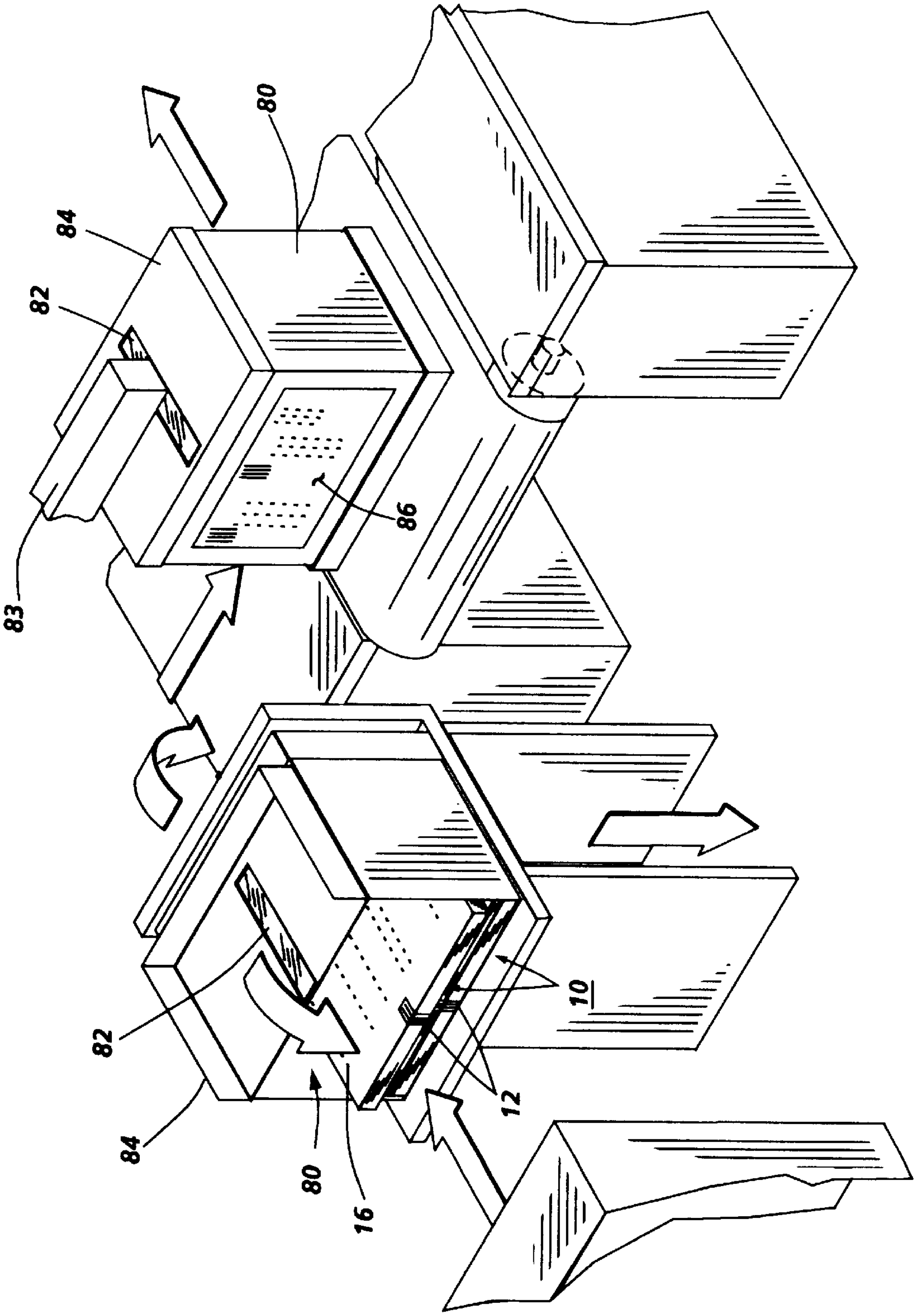
FIG. 5 is the exemplary stacking container of FIG. 4, on a transport belt with the cover closed and turned upwards to expose the binding tape bar codes on the set edges to a bar code reader.

As shown for example in FIGS. 4 and 5, these packaged and uniquely encoded sets 10 may then desirably be sequentially fed from a subject tape binding finisher directly into an open sided job storage box 80 on, or comprising, a stacker. A known type of vertical elevator movable support for the container 80 may be provided if it is desirable to keep the stacking level at the same level as the box 80 fills. Each box 80 may be filled sequentially with multiple outputted tape bound sets, to temporarily hold several sequential jobs, for temporary storage and/or local movement. After each box 80 is filled, it may be manually or automatically removed and replaced at the same printer and/or binder output position with another, empty, box 80.

Each box 80 preferably has an apertured or open side, slot, and/or transparent window 82, through which the exposed edge of the encoded tape strip 12 on each job set 10 stacked therein may be read by sweeping along one side of the box 80 within that window 82 with a bar code scanner 83, such as the well known portable hand held wand or gun type, or a stationary type 83 as shown in FIG. 5. Rapidly scanning all the job storage box 80 contents by reading all the exposed job tape 12 edges is easily accomplished with this system. The side of the box 80 having the slot or transparent window 82 can be a hinged box top 84 which can be closed, as shown. The box 80 can be tipped on its side with the top folded up out of the way, as shown in FIG. 4, for side loading of job sets, and then the box can be tipped or rotated upright and the cover closed after the jobs are loaded therein, as shown in FIG. 5, so that the coded job edge tapes are visible from the top of the box. This read information may be compared with the bar code job identity information previously stored into the computer database, an/or used to generate and print an itemized packing sheet 86 listing the job contents of the box. That packing list 86 can be placed in a transparent sleeve or holder on the outside of the box 80 so that the box does not even have to be opened to note or identify its job contents. Each box 80 itself desirably has its own unique bar code identity within the job shop or printing plant. That can also be printed on this packing sheet list 86.

As noted above, another application of printed indicia coding of one or both tape segments binding the sets 10 to provide uniquely encoded sets 10 is for "mailbox" applications, in which the tape set edge encoding can be read to automatically direct the feeding or transport and distribution to a particular locked and/or identified bin, of a sorter-like apparatus, of a particular set or sets 10 intended for a particular user accessing that bin, where there are multiple said bins. This can be used for the bound and encoded and then uniquely distributed output of a shared or networked copier, printer, or facsimiles machine.

FIG. 11 shows anther embodiment. Here, an otherwise conventional exemplary copier 90 has an integral compiler/tape printer/tape binder 92. The copy output sets 10 are stacked and bound as otherwise described above, and printed if desired by a tape printer 70, in a compiler tray 94 inside the copier 90, which also has a normal single sheet output path as shown. The temporarily tape bound sets may be ejected for stacking by an intermittent belt or other set ejection transport 96 running under the compiler tray 94. The ejected sets 10 may be stacked as described, or otherwise, or transported into a conventional associated finisher for additional, permanent, binding if desired.

Figure 3:
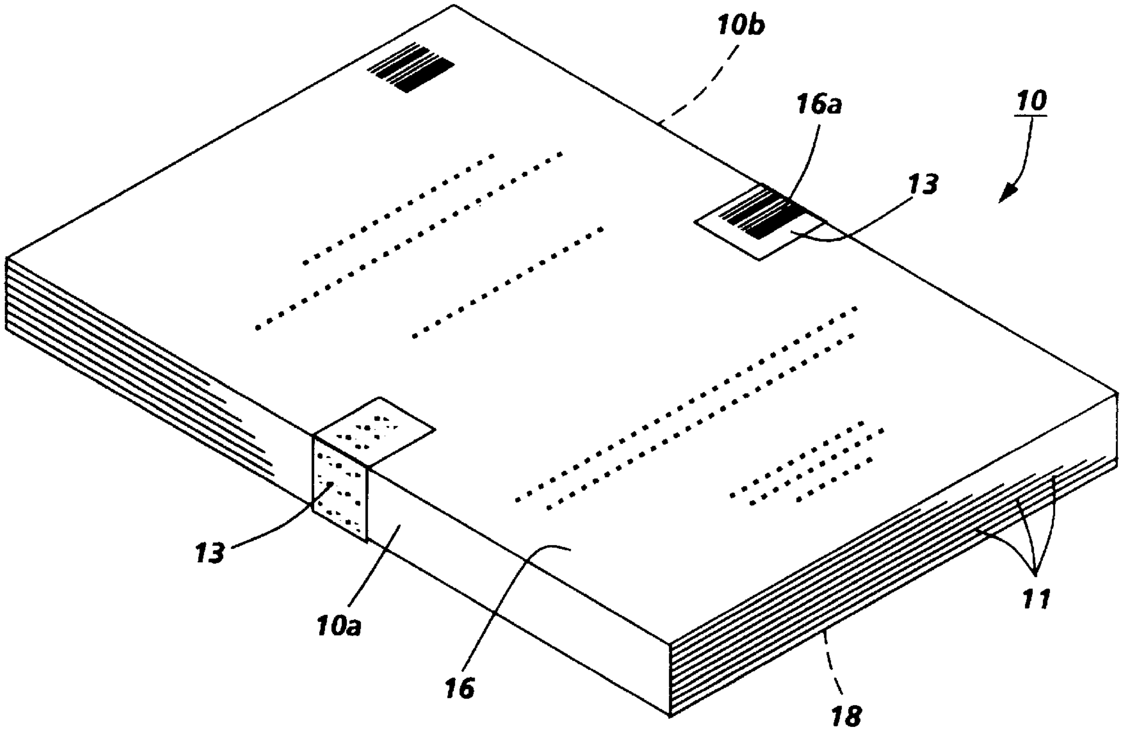
FIG. 3 is a perspective view of another exemplary single set, of a larger number of paper sheets, here temporarily bound together by two different exemplary tearable paper tape binder strips with a high tack adhesive bind to cover sheets of heavier paper or card stock, and with set identification marking indicia (here, a unique machine readable bar code)

A different tape binding system embodiment, such as shown in FIG. 3, is particularly preferred for applications involving a particularly thick set of sheets to be bound, such as sets of more than than 50 sheets, to be temporarily bound in accordance with the present system. There it is found that a more secure binding system is provided by using tape binding segments 13 with a more aggressive adhesive, and special heavier paper cover sheets for the top and bottom of the set to be bound, such as card stock. These can then be torn off for removal without damage to the actual sheets of the sets. By using heavier paper cover sheets, the cover sheet itself may be lifted up, rather than the tape, and the edge of the cover sheet can cut or rip through the binding tape, rather than the tape being removed by peeling off of the top and bottom sheets as is preferred for smaller sets. Preferably, these heavier paper cover sheets are automatically fed out by the copier or printer, automatically interleaved with the sets, as is well known per se in commercial copier products and their patent literature.

While the embodiments disclosed herein are preferred, it will be appreciated from this teaching that various alternatives, modifications, variations or improvements therein may be made by those skilled in the art, which are intended to be encompassed by the following claims:

What is claimed is:

1. A method of improved segregation, separation, distribution and handling of multiple print job sets as discrete integral print job sets, each of which print job sets comprises a neatly stacked plurality of individual flimsy output sheets of a printing apparatus, comprising:

sequentially printing and compiling selected plural said individual output sheets into multiple separate respective neatly stacked job sets with top and bottom sheets at the top and bottom of respective said stacked job sets;

automatically dispensing a corresponding multiplicity of small thin strips of low-tack adhesive tape, which low-tack adhesive tape strips are each only a minor percentage of the dimensions and surface area of said output sheets and have a low tack adhesive which is readily releasable from engagement with said flimsy individual output sheets without any visible marking or printing damage of said output sheets;

automatically only partially adhesively adhering, removably, one said small strip of low-tack adhesive tape only partially around each of two opposing sides of each said neatly stacked job set, intermediately thereof, extending over only a minor portion of the dimensions of said job set, so that each said strip wraps around one edge of said stacked job set to removably adhere to only to a minor portion of only said top and bottom sheets, to temporarily tape together each said stacked job set into a separate integral job set of said flimsy output sheets temporarily held together solely by said two removable tape strips to provide temporary job set integrity with resistance to individual sheet skewing, sheet fanning, and other sheet misalignment of said output sheets in said temporarily taped job set, for integral job set handling and distribution;

sequentially outputting and stacking a multiplicity of said compiled and temporarily taped together printed job sets of said flimsy individual output sheets into a commonly superposed stack of said job sets so that each said temporarily taped job set is readily edge discriminated and separated from one another in said common stack by exposed edge areas of said tape strips for job set separation, handling and distribution;

separately distributing said temporarily taped job sets to designated job recipients as integral bound sets edge identified as individual job sets and readily separated for separate handling and distribution as a temporarily bound set relative to other said temporarily bound sets by said exposed edge areas of said tape strips, with each said temporarily bound job set maintained as a uniform integral sheet stack by said tape strips during said set distribution;

and then subsequently manually removing at least one end of at least one of said two small tape strips from said distributed job sets without any visible marking or printing damage of said printed output sheets thereof to readily release said individual flimsy printed output sheets of said job set.

2. The method of improved segregation, separation, distribution and handling of multiple print job sets of claim 1, wherein each said low-tack adhesive tape strip is so dispensed with a low tack adhesive on one side but a manually graspable non-adhesive minor area at at least one end thereof for tape strip removal assistance; and wherein said tape strip is also dispensed with instructions for its removal printed on its opposite non-adhesive side, which instructions are visible as said tape strip is so applied to said stacked job set.

3. The method of improved segregation, separation, distribution and handling of multiple print job sets of claim 1, wherein said step of manually removing said tape strip comprises manually grasping and pulling on a substantially nonadhesive integral pull off tab portion of said tape strip applied at an exposed position readily allowing manual grasping of said pull off tab portion and peeling off of said low tack tape strip thereby.

4. The method of improved segregation, separation, distribution and handling of multiple print job sets of claim 3, further including the step of automatically electronically reading said unique printed job set identifying indicia while said said job sets are in said single commonly superposed stack for job set distribution.

5. The method of improved segregation, separation, distribution and handling of multiple print job sets of claim 1, wherein said step of automatically dispensing a multiplicity of small thin strips of low-tack adhesive tape further includes a step of printing unique job set identifying indicia intermediately on at least one said tape strip dispensed for a respective job set; and wherein said step of automatically partially adhesively adhering one said tape strip only partially around each of two opposing sides of each said stacked job set further includes applying said tape strip so that said printed job set identifying indicia is visible at one edge of said job set after said step of stacking said multiple said job sets in a single commonly superposed stack thereof.

6. The method of improved segregation, separation, distribution and handling of multiple print job sets of claim 5, further comprising the step of also printing discrete set identifying printed indicia on said top or bottom sheet of said compiled job set stack with said printing apparatus.

7. The method of improved segregation, separation, distribution and handling of multiple print job sets of claim 1, further including the step of automatically switching the output of said output sheets by said printing apparatus to automatically output at least one of said top and bottom sheets for said job set as a cover sheet of a substantially heavier sheet material than said flimsy output sheets in response to a said job set in excess of a preset number of said output sheets in said job set.

8. The method of improved segregation, separation, distribution and handling of multiple print job sets of claim 7, where said preset multiple number of said output sheets in said job set is approximately 50 sheets.

9. The method of improved segregation, separation, distribution and handling of multiple print job sets of claim 1, wherein said printing apparatus automatically switches the output of said output sheets, in response to a said job set in excess of a preset multiple number of said output sheets in said job set, to automatically output at least one of said top and bottom sheets for said job set as a cover sheet of a substantially heavier sheet material than said flimsy output sheets, and also switches said automatic dispensing of small thin strips from said low-tack adhesive tape to a more aggressively adhesive tape which is also only a minor percentage of the dimensions and surface area of said output sheets but which is not pealably removable therefrom but which is is tearable by lifting said heavier cover sheet relative to the rest of its job set.

10. The method of improved segregation, separation, distribution and handling of multiple print job sets of claim 9, where said preset multiple number of said output sheets in said job set is approximately 50 sheets.

11. The method of improved segregation, separation, distribution and handling of multiple print job sets of claim 1, further including automatically selectably feeding at least one of said top and bottom sheets as a cover sheet of a substantially heavier sheet material than said flimsy individual output sheets in response to a number of said flimsy individual output sheets exceeding a preset multiple number, said heavier cover sheet having sufficient strength to tear through said tape strips with the edges of said heavier cover sheet; and further including the step of manually forcably lifting an unsecured end of said heavier cover sheet relative to the rest of said temporarily taped job set to tear through at least one of said tape strips.

12. The method of improved segregation, separation, distribution and handling of multiple print job sets of claim 11, where said preset multiple number of said output sheets in said job set is approximately 50 sheets.

13. The method of improved segregation, separation, distribution and handling of multiple print job sets of claim 1, wherein said tape strips are so dispensed with one adhesive side, but with said adhesive side having a narrow relatively nonadhesive area extending intermediately therealong for nonadhesive contact of said adhesive side by a narrow tape feeding drive roller during said tape strips dispensing step.

14. The method of improved segregation, separation, distribution and handling of multiple print job sets of claim 1, wherein said printing apparatus automatically switches the output of said output sheets and said tape dispensing means automatically switches to dispense different, substantially more adhesive, but tearable said tape strips, in response to a thicker said job set in excess of a preset thickness, to output said top and bottom sheets as cover sheets of a substantially heavier sheet material than said normal flimsy output sheets, which heavier cover sheets are bound by dispensing said more adhesive tape strips to non-pealably adhere to said heavier cover sheets for greater thick job set stack integrity, but which thicker job set is separable by tearing through said tape by lifting said heavier cover sheets.

15. The method of improved segregation, separation, distribution and handling of multiple print job sets of claim 1, wherein said small tape strips are applied substantially centrally around the two longest and most closely adjacent sides of said compiled job set stack.

16. The method of improved segregation, separation, distribution and handling of multiple print job sets of claim 1, wherein said outputting and stacking step comprises commonly superposed stacking of said printed job sets in a movable job stacking and handling container apertured for external job set identification of all of the job sets within said movable container, and wherein all of said job sets within said movable container are pre-printed on at least one said respective tape strip thereof with set identifying printed indicia readable from said one edge of said job sets through said aperture in said movable container.

17. The method of improved segregation, separation, distribution and handling of multiple print job sets of claim 16, further comprising reading for distribution purposes said set identifying printed indicia from the edges of said job sets after said job sets have been stacked in said movable job stacking and handling container, and automatically variably moving said movable job stacking and handling container in response thereto.

* * * * *